Patented May 4, 1937

2,079,042

UNITED STATES PATENT OFFICE 2,079,042

MACHINE FOR THE ELECTRIC WELDING OF THE SIDE-MEMBERS OF VEHICLE FRAMES

Léon Salves, Billancourt, France, assignor to Louis Renault, Billancourt, France Application June 10, 1936, Serial No. 84,564
In France January 17, 1936

9 Claims. (Cl. 219—4)

The present invention relates to a machine for the electric welding of the side-members of vehicle frames, which provides for the stick welding, in a continuous and automatic manner, of the edges of a tubular side-member, upon a line of any desired form.

The outfit consists of two electric apparati adapted for stick welding, by the use of electrode holders which are connected together by a pneumatic device and are in constant contact with the edges of a copying template whose outline corresponds to the outline of the side-member.

The side-member and the said template are mounted on a carriage which is attached to an endless chain whose movement is controlled in an intermittent manner by an electric motor provided with a suitable clutch.

Various devices are employed in order that the different successive operations which are necessary to effect the welding and forward movement of the side-member shall not interfere with one another, thus assuring an approved stick welding in the minimum time.

The following description, with reference to the accompanying drawings, sets forth the present invention.

Figure 3:
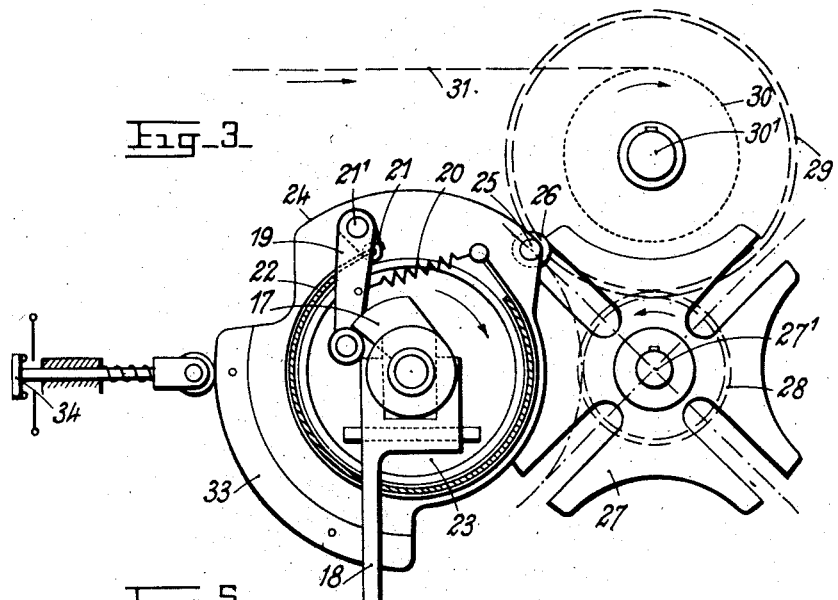
Fig. 3 is a detail showing the mechanism for the forward movement of the carriage supporting the side-member, with its uncoupling mechanism.
Figure 5:
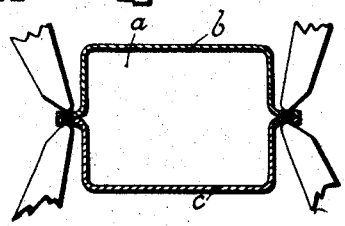
Figs. 5 and 6 are cross-sections of the side-member on a large scale.
Figure 6:
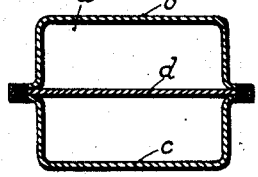
Figure 4:
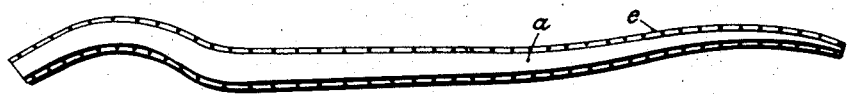
Fig. 4 is an elevational view of the side-member.

In a French patent to the same inventor, No. 759,940, dated November 19th, 1932, and its successive additions, the side members employed for the construction of the vehicle frame usually consist of a tubular piece $a$, Fig. 3, comprising two pressed pieces $b$ and $c$, Fig. 5, which are placed together on their open sides and are connected by electric welding at points $e$ having a regular spacing. Furthermore, as set forth in a French Patent No. 767,311 of January 19th, 1934, to the same inventor, a middle plate $d$ may be mounted between the pressed pieces $b$ and $c$, Fig. 6 and may be connected to said pieces by welding at various points.

The machine, the subject-matter of the invention, has for its object to connect the two pressed pieces $b$ and $c$, with or without the interposition of the middle plate $d$, by a series of points $e$ obtained by electric welding, and in a continuous and automatic manner, whatever be the outline of the side-member of this construction. The connection between the pieces $b$ and $c$ is effected in the known manner, by means of flanges which are suitably bent to the exterior, these being welded together at various points.

In the first place, the pieces $b$ and $c$ are placed one upon the other and are suitably held together in order to form the side member $a$. The side member $a$ is then centered upon supports $f$ forming part of a member 11 termed "reproducer", whose edges 12 are given an outline corresponding to that of the side member $a$.

The reproducer 11 and the side-member $a$ are mounted on a carriage 1 which is coupled by a hook 32 to an endless chain 31 passing over a sprocket wheel 30 which is given an intermittent movement of rotation in the manner which will be further set forth.

On the respective sides of the carriage 1 are mounted two electric machines adapted for welding at various points, each of which consists of a carriage 2—3 which is movable transversely on roller races, in order to engage the edges of the side-member $a$ between the electrodes $45^1$—$46^1$ mounted in holders 45—46 which are suitably pivoted at $45^2$—$46^2$ to supports mounted on the carriages 2—3.

The carriages 2—3 are connected together by an air cylinder 4 pivotally mounted under the carriage 3 and in which is movable a piston 5 whose rod is connected at 6 to the carriage 2. The cylinder 4 is connected by piping $4^1$ to an air control valve device 7 which permits the discharge of the air contained in the chamber A located above the piston 5; the chamber $A^1$ under the piston 5 is connected by piping $8^1$ to an air tank 8. Each carriage 2—3 carries a respective roller 9—10 which is placed in constant contact with the edges 12 of the reproducer 11, under the action of the pressure of the air from the tank 8, which pressure acts constantly upon the surfaces of the said piston and cylinder.

The roller 9 is secured to the carriage 2 by means of a spring-mounted fork which is provided with a rod 13 adapted to close an electric circuit at B.

Two electrically-controlled valve devices 14—15 are connected on the one hand by piping $14^1$—$15^1$ to the tank 8, and by piping $14^2$—$15^2$ to air cylinders 37—38 pivotally mounted at $37^1$—$38^1$ on the lower electrode-holders 45—46; the pistons $37^2$—$38^2$, movable in said cylinders, are pivotally connected by their rods with the upper holders.

On the pipes 14¹—15¹ connecting the tank 8 to the electric valves 14—15 are mounted the pipes 39¹—40¹ leading to the lower part of the respective cylinders 39²—40² in which are movable the pistons 39³—40³ acting under one end of the respective rocker arms 41—42 which are pivoted to the frame and whose other ends are in constant contact with auxiliary pistons 39—40 which are movable in cylinders 39⁴—40⁴ connected by piping 39⁵—40⁵ to the piping 14²—15² mounted between the electric valves 14—15 and the cylinders 37—38, respectively.

The rocker arms 41 and 42 control suitable switches adapted to close electric circuits at D and D¹, whereby the relays and watt-hour meters 45³—46³ of the transformers connected to the holders 45—46 will give passage to the proper amount of current to the electrodes 45¹—46¹, for the stick welding. In like manner, the electric valves 14—15 will control suitable switches adapted to close the circuits at B¹.

A solenoid device 16, which is excited by the closing of the circuit at B when the said electric valves are released, acts upon a forked member 18, pivoted on an axle 43, in order to disengage a cam 17 which is slidable in the direction F on a shaft 51 which is driven by an electric motor. When the said cam recedes, it will be released from the stud 19¹ of a lever 19 which is controlled by a spring 20, and said lever, when pivoting on its axle 21¹, will permit a crank 21 to apply a band 22 upon a brake drum 23 which rotates constantly with the shaft 51, and thus rotates a member 24 upon which is mounted an axle 25 carrying a roller 26; said roller, in its rotation, will engage in one of the grooves of a Maltese cross 27, thus turning the latter through 90°.

The said Maltese cross is secured to a shaft 27¹ to which is keyed a pinion 28 in constant engagement with a gearwheel 29 keyed to the shaft 30¹ of the sprocket wheel 30, carrying the chain 31 connected to the carriage 1.

The member 24 is secured to a cam 33 whose periphery acts upon a contact device 34, and when this device is no longer pressed by the said cam, it will close the circuit at C by means of its spring, thus exciting the electric valves 14—15, and said valves will be raised, thus breaking the circuit at B¹. At this time, a spring 35 draws back—against a stop 36—the fork 18 controlling the said cam, thus engaging the cam with the stud 19¹ of the lever 19, in order to release the band 22 from the brake drum 23, thus stopping the rotation of the member 24 and hence the movement of the chain 31 and of the carriage 1.

Figure 1:
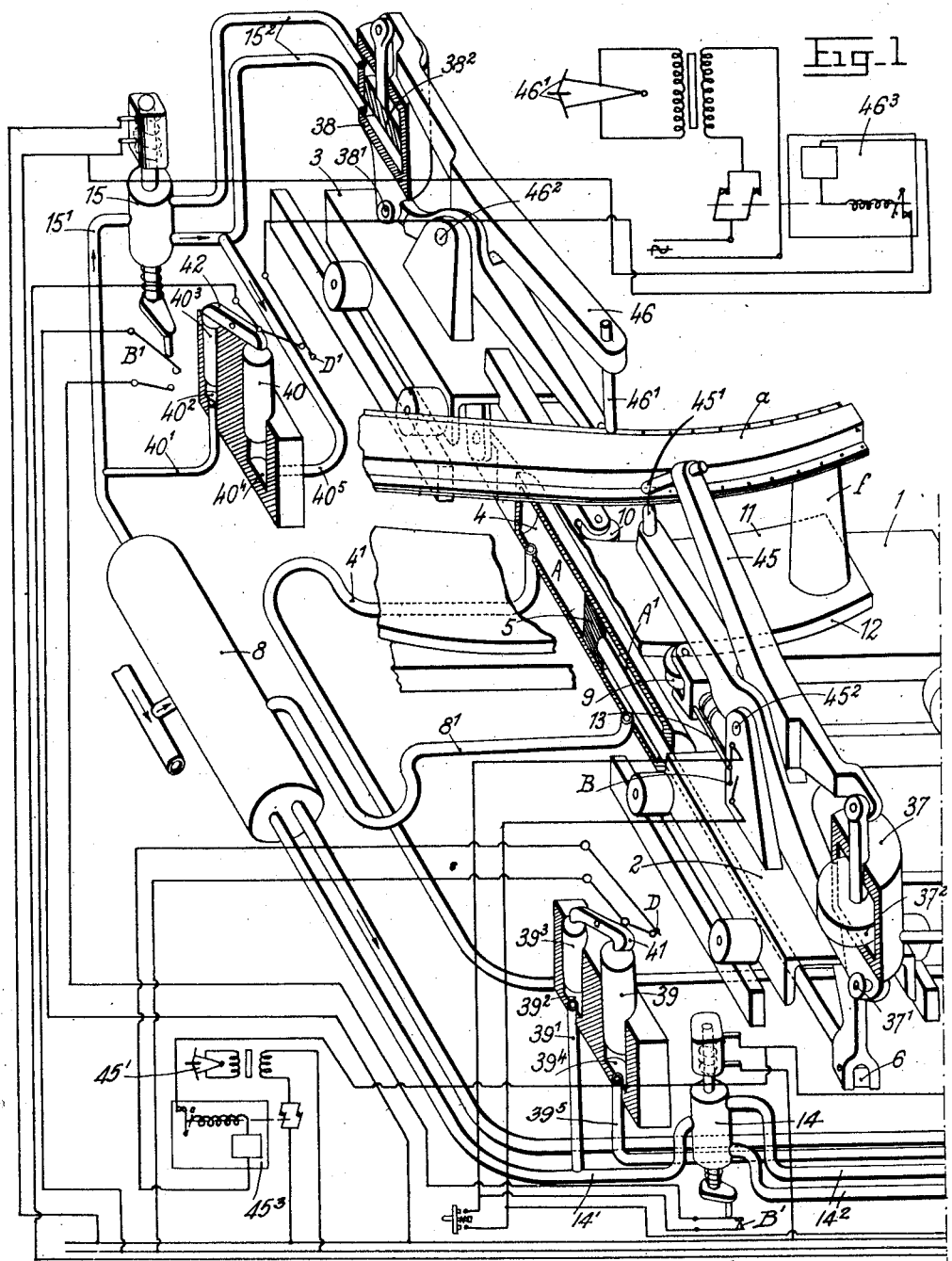
Fig. 1 is a diagrammatic perspective view of a part of the machine, in the welding position.
Figure 2:
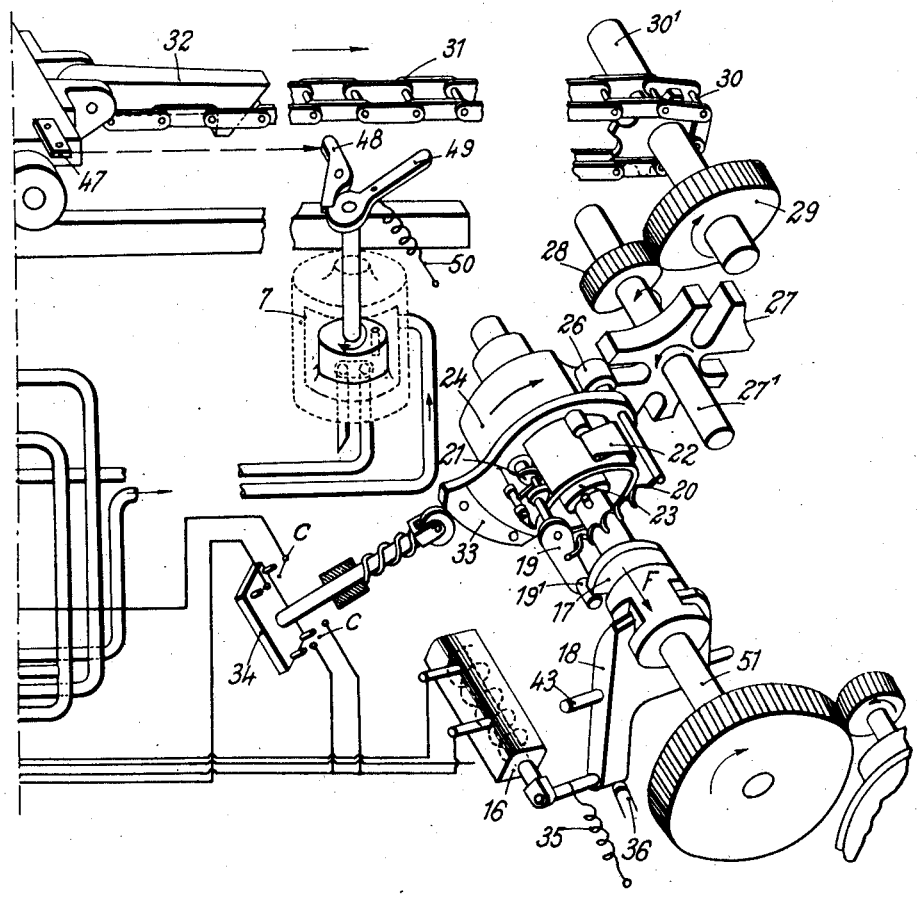
Fig. 2 is a diagrammatic perspective view of the part of the machine adjacent to the part shown in Fig. 1.

The operation is as follows:

Referring to Figs. 1 and 2, which are perspective views of the apparatus in the welding position, it will be noted that the electrodes 45¹—46¹ mounted in the pivoted holders 45—46 are in contact with the edges of the side-member $a$.

At the start, after the side-bar and the reproducer 11 have been mounted on the carriage 1, the carriages 2—3 are brought near each other by means of the air cylinder 4 which is mounted on the carriage 3 and in which is movable the piston 5 extended by a rod connected to an axle 6 mounted on the carriage 2. This movement of the carriages 2—3 towards the side-member $a$ will place the edges of the side-member between the electrodes 45¹—46¹ mounted in the holders 45—46. The movement of the piston 5 in the cylinder 4 is controlled by the air distributer 7 which provides for the discharge of the air from the part A of the cylinder. The pressure of the air supplied by the tank 8, which is constant on the faces of the piston and cylinder, has the effect of maintaining the rollers 9—10 mounted on the carriages 2—3, in constant contact with the outlined edges 12 of the reproducer 11. As the roller 9, mounted on the carriage 2, is located in a spring-mounted fork, it is thus movable with reference to said carriage.

When the roller 9 makes contact with the edge 12 of the copying template 12 which is in the adjacent position, it is moved back, and by means of the rod 13 secured to its fork, it will act upon a switch in order to close the circuit at B. At this time, the electric valves 14—15 are in the released position, thus closing the circuit at B¹. The solenoid 16 is thus excited, and it actuates the uncoupling fork 18, which is now turned upon its axle 43 and releases the cam 17 towards the rear. As the said cam is displaced in the direction of the arrow F, it disengages the stud 19¹ from the lever 19, and said lever will turn—by means of the spring 20—about its axle 21¹, thus moving the crank 21, whereby the band 22 will be applied upon the brake drum 23, which is in constant rotation hence actuating the member 24 carrying the axle 25 of the roller 26. The said roller engages in one of the grooves of the Maltese cross 27, thus turning the latter through 90°, after which the roller will be released from the said groove.

The rotation of the Maltese cross has the effect—through the pinions 28 and 29—of rotating the sprocket wheel 30, and thus the chain 31 will drive the carriage 1 supporting the side-member, by a determined distance corresponding to the distance between two points of the welding.

When the roller 26 is about to leave the groove of the Maltese cross, owing to the rotation of the member 24, the cam 33 which is mounted on the member 24 will release the double contact device 34, which will drop at once, thus closing the circuit at C. At this time, the electric valves will be excited, and will thus rise, breaking the circuit at B¹, and thus the spring 35 will bring the fork 18 controlling the said cam, against the stop 36. The said cam will now act upon the stud 19¹ of the lever 19, and by turning this latter, against the action of the spring 20, it will effect the release of the band 22 by means of the crank 21. As the said band is no longer drawn forward by the rotation of the brake-drum 23, the member 24 will no longer rotate, and thus the movement of the chain 31 and of the carriage 1 will be stopped.

It will be noted that during the 90° rotation of the roller 26, i. e., during the movement of the chain 31 and of the carriage 1, the electric circuit for the welding is open, and the holders carrying the electrodes 45¹—46¹ are separated from the edges of the side-member $a$.

The back and forward movements of the holders 45—46 are effected by means of the air cylinders 37—38. When the cam 33 has ceased to act upon the contact device 34 owing to the rotation of the member 24, said device will drop at once, thus closing the circuit at C. The electric valves are thus excited, and hence the valves will be opened, thus allowing the air from the tank 8 to pass through them and to proceed through one of the pipes 14²—15² to the lower part of the cylinders 37 and 38, and hence under the pistons 37²—38². Due to the air pressure on the said pistons, they will rise and will thus turn the holders 45—46 about their axes 45²—46², thus bringing the electrodes 45¹—46¹ into contact with the edges of the side-member a. Furthermore, as the pressure is balanced with reference to the tank, this will raise the auxiliary pistons 39—40, which act in turn upon the rocker-arms 41 and 42, thus closing the circuit at D and D¹.

At this time, the relays and the watt-hour meters 45³—46³ of the transformers of the holders 45—46 will act, thus giving passage to the necessary amount of current for the stick welding.

The said relays and watt-hour meters will now automatically break the welding circuit, and as the same current serves to energize the electric valves 14—15, these latter serve a double purpose, as they place the air cylinders 37—38 in the discharging position, and also supply air under the pistons 37²—38² for moving back the holders 45—46. At this time, the auxiliary pistons 39—40 descend, thus ceasing to act upon the rocker-arms 41—42, and hence the welding circuit is opened at D and D¹.

As the welding circuit is now broken, this releases the electric valves 14—15, which close the circuit at B¹.

The solenoid 16 is again excited, and the cycle of operations continues as before.

When the carriage 1 arrives at the end of its course, a stop 47 acts upon a pawl 48 in order to release it from a lever 49 mounted on the valve 7. The lever 49, which is urged by a spring 50, will actuate the said distributer, and the air will be supplied to the chamber A of the cylinder 4, thus separating the carriages 2 and 3 on which the holder 45—46 are pivoted.

Owing to the backward movement of the carriage 2, the movable roller 9 is no longer in contact with the edge 12 of the template 11, and by the action of its spring, the rod 13 is released from the switch, thus breaking the circuit at B.

An apparatus for the stick-welding of side members can thus be constructed, in which all the necessary operations are performed in the most approved manner, and such operations will by no means interfere with one another. Thus for instance during the forward movement of the carriage 1, the electrodes 45¹—46¹ will not make contact with the edges of the side-member a, and further, when the electrodes are brought near each other, the carriage can by no means be moved. The control is obtained in all cases by the use of circuits which are automatically opened and closed by electric valves, for the circulation of the air which is required for the pneumatic cylinders, and by electro-magnetic devices.

I claim:

1. A machine for the electric welding of the side-members of vehicle frames, comprising means for effecting an intermittent longitudinal movement of a frame side-member, electrode-holders disposed on each side of the side member and adapted for stick welding along the side-member, means for displacing said electrode-holders transversely to the side-member, means for limiting the movement of the said electrode-holders towards the side member, means for controlling the application of the electrode-holders to the side member when the longitudinal movement of the side member is stopped, means for controlling the closing of the welding circuit when the electrode-holders are brought together, an automatic wattmeter adapted to break the welding circuit after the supply of a determined quantity of electric power, means for controlling the starting of the device adapted for the longitudinal displacement of the side-member when the electrode holders are separated, and means for stopping the longitudinal movement of the side member, after each continuous displacement through a given length.

2. A machine as claimed in claim 1, in which the means for the longitudinal displacement of the side-member comprises a carriage supporting the side-member, a chain adapted for the traction of said carriage, gear-wheels driving the said chain, a Maltese cross for actuating the said gear-wheels, a wheel provided with a roller co-operating with the said Maltese cross, a driving shaft, and a coupling device located between the said wheel and the driving shaft.

3. A machine as claimed in claim 1, in which the means for the displacement of the electrode-holders transversely to the side-member, comprises two electrode-holders located on the respective sides of the side-member, two carriages supporting the said electrode-holders, a cylinder connected to one of the two carriages, a piston connected to the other carriage, and means for admitting a fluid under pressure to the interior of the said cylinder, thus moving the carriages provided with the electrode-holders towards or from each other.

4. A machine as claimed in claim 1, in which the means for limiting the movement of the electrode-holders towards the side-member comprises a piece which is secured to the side-member and whose form corresponds to that of the side-member, and stops mounted on the carriages of the electrode-holders and adapted to make contact with the edges of the said piece, thus limiting the movement of the carriages towards each other.

5. A machine as claimed in claim 1, in which the means for controlling the application of the electrode-holders to the side member during the stopping of the longitudinal movement of the side-member, comprises a cam mounted on a member of the device controlling the longitudinal movement of the side-member, an electric contact device actuated by said cam and adapted to close electric circuits, electromagnetic valves supplied by circuits closed by the said contact devices, cylinders and pistons respectively connected to the two branches of each electrode-holder, and conduits supplying fluid under pressure which are connected to said cylinders and are controlled by said electro-magnetic valves.

6. A machine as claimed in claim 1, in which the means for controlling the closing of the welding circuit when the electrode-holders are moved forward, comprises movable contact-pieces connected in series in the said circuit, and devices actuated by the forward movement of the said electrode-holders, in order to close the circuit at the said contact-pieces.

7. A machine as claimed in claim 1, in which the means for controlling the separation of the electrode-holders by the breaking of the welding circuit, comprises cylinders and pistons connected to the branches of the said electrode-holders, conduits supplying fluid under pressure to said cylinders, electromagnetic valves controlling the circulation of the fluid under pressure in said conduits, and a circuit for the supply of said electromagnetic valves by the welding current.

8. A machine as claimed in claim 1, in which the means for controlling the starting of the device for the longitudinal displacement of the side-member when the electrode holders are separated, comprises a coupling device mounted in the mechanism for the longitudinal displacement of the side-member, an electric relay adapted to effect the clutching of said coupling device when it is excited, and an electric circuit comprising a set of switches which are closed when the said electrode-holders are separated.

9. A machine as claimed in claim 1, comprising a pawl which is actuated by the displacement of the side-member when the last welding operation has been completed, a spring-mounted device which is released by said pawl, and a device for effecting the separation of the electrode-holders from the side-member by the release of the said spring-mounted device.

LÉON SAIVES.